Nov. 2, 1965  L. C. PARKER  3,215,222
VEHICLE ROAD SPEED CONTROL SYSTEM
Original Filed April 24, 1962

INVENTOR.
LELAND C. PARKER, DECEASED,
BY LAURA H. PARKER, ADMINISTRATRIX
BY D.D. McGrant
ATTORNEY

United States Patent Office 3,215,222
Patented Nov. 2, 1965

3,215,222
VEHICLE ROAD SPEED CONTROL SYSTEM
Leland C. Parker, deceased, late of Rochester, N.Y., by Laura H. Parker, administratrix, Rochester, N.Y., assignor to General Motors Corporation, Detroit, Mich., a corporation of Delaware
Original application Apr. 24, 1962, Ser. No. 189,767. Divided and this application Dec. 22, 1964, Ser. No. 420,464
8 Claims. (Cl. 180—82.1)

This is a division of copending application Serial No. 189,767, entitled, Vehicle Road Speed Control System, and filed April 24, 1962.

The invention relates to a vehicle road speed control system and more particularly to a system wherein modulated control of the system is obtained by a pressure sensitive modulating valve acting to provide a control pressure to a servo connected to move the engine throttle, and to methods of obtaining the control pressure. The pressure for actuating the modulating valve is responsive to vehicle speed and is modified by a desired speed set valve. In accomplishing these results it is proposed to utilize a pressure sensitive device such as a Bourdon tube connected to actuate the modulating valve upon movement of the tube in response to pressure in the tube. The pressure in the tube may be a fluid under a positive pressure or under a negative pressure as compared to atmospheric pressure. The invention is disclosed in a drawing in a system wherein the pressure in the Bourdon tube is positive and in which a fluid such as oil may be used. The system uses a pressure generating mechanism driven in accordance with the speed of the vehicle. The system utilizes a vehicle brake actuation control valve for releasing the system from the speed control condition of operation.

In the drawing:

FIGURE 1 is a schematic presentation of a speed control system embodying the invention and installed on an engine in a vehicle. Parts are illustrated as broken away and in section;

FIGURE 1a is a view of a portion of the system of FIGURE 1 taken in the direction of arrows 1a of that figure and having parts broken away and in section.

The system of FIGURE 1 utilizes a pressure generating system for generating a positive pressure responsive to vehicle speed and controlling the system. The system is preferably installed in a vehicle to control the engine 10 and therefore control the vehicle speed. The engine is provided with an intake manifold 12 on which is mounted a carburetor 14 for introducing a suitable fuel-air mixture under control of throttle valve 16. A throttle link 18 connected to rotate throttle valve 16 is actuated through throttle links 20 and 22 by the accelerator pedal 24. The accelerator pedal 24 is controllable by the vehicle operator in the usual manner. A throttle link 26 is also provided, and may be a part of the existing throttle linkage, to which the servo throttle link control rod 28 is attached. A throttle return spring 30 is suitably attached to one of the throttle links so as to urge throttle valve 16 to a normally closed throttle position. Rod 28 is connected through an adjustable connection 32 to the arm 34 of the power servo 36. Servo 36 includes a housing 38 suitably secured to the engine 10. Housing 38 is divided by a diaphragm 40 into a control chamber 42 and an atmospheric chamber 44. The latter chamber is maintained at atmospheric air at all times through the opening 46 provided for the servo arm 34. Other suitable atmospheric air inlet means may be provided if desired.

A control pressure conduit 60 is secured to the housing 38 so that control pressure in conduit 60 may be impressed on diaphragm 40 through control chamber 42. Since the control pressure acting on one side of diaphragm 40 is variable and is different from atmospheric pressure, which acts on the other side of the diaphragm, the diaphragm or power wall is movable in response to the pressure differentials acting on it as the control pressure varies. A restriction 62 is provided in conduit 60 immediately adjacent control chamber 42. Conduit 60 is connected through a conduit 64 to a negative feedback assembly 66 which is further described below. Conduit 60 is also connected to a brake pedal operated spoiler valve assembly 96 which will admit atmospheric pressure to control chamber 42 immediately, under positive control of the spoiler valve, by cancelling the control pressure in conduit 60 and venting that conduit to atmosphere. This renders servo 36 inoperative to control the engine throttle valve 16.

Valve assembly 96 is actuated when the vehicle operator engages the vehicle brakes through the brake pedal 98 and the brake lever 100. Lever 100 is illustrated as being pivotally mounted to a bracket 102 or other suitable portion of the vehicle body. The connections between brake lever 100 and the vehicle brake system are not illustrated since they are not pertinent to the invention. Lever 100 is provided with a detent 104 which is in engagement with a spoiler valve operating spring 106 to which the spoiler valve 108 is attached. This valve may be loosely recessed in spring 106 so that it can readily align its face with the mating face of orifice 112 formed in the spoiler valve block 114. The interior of valve block 114 is connected to control pressure conduit 60 and is maintained at the control pressure in conduit 60 so long as valve 108 is seated to keep orifice 112 closed. When the brake pedal 98 is depressed by the operator, detent 104 is moved to release the force against spring 106 holding valve 108 in the orifice closed position, and the spring moves the valve face away from the orifice 112 so that conduit 60 is vented to atmosphere through the orifice. This immediately vents control chamber 42 of servo 36 to atmosphere. Under this condition the throttle linkage return spring 30 will urge the throttle valve 16 toward the zero throttle position since there is no resisting force acting on diaphragm 40 to hold the throttle in the advanced position.

The negative feedback valve assembly 66 has an engine intake vacuum conduit 92 connecting the intake manifold with the passage 280 formed in the valve assembly cover 270. The passage 252 in valve assembly housing 164 is connected to conduit 64. A chamber 248 is also formed in housing 164 and the lower end thereof is connected with passage 252 by passage 250. Passage 250 is sufficiently large to permit fluid flow between chamber 248 and passage 252 without restricting that flow further in view of other passages and orifices to be described. An insert 254 is provided in an intermediate portion of chamber 248 so that it does not interfere with passage 250. A control-limiting orifice 256 is provided in insert 254 and connects the upper end 258 of chamber 248 with the lower portion thereof connecting with passage 250.

The chamber upper end 258 is formed in the face 260 of the side of housing 164 adjacent cover 270 and above the lower part of chamber 248 so that the portion of chamber end 258 adjacent the plane of the face is annular with a boss 262 extending through the center thereof. Boss 262 has a recess 264 formed therein and extending downwardly from the plane of face 260. A slot 266 is formed across one side of boss 262 so that it connects recess 264 with the chamber upper end 258. This slot may be formed in any suitable manner, but it has been found particularly desirable and practical to form it with a V cross section having a closely controlled cross section area. The area of slot 266 below the plane of face 260 will define an orifice having a smaller cross section area than limiting orifice 256. A diaphragm and gasket 268, preferably formed of Mylar, a polyester resin which is the reaction product of terephthalic acid and ethylene glycol, is received on face 260 and retained thereon by cover 270. This type of material is preferred due to its physical characteristics of strength and weight and coefficient of friction. It is obvious, however, that other materials capable of forming the functions of diaphragm 268 may be used. Diaphragm 268 is provided with an orifice 274 aligned with recess 264 and having a cross section area greater than the cross section area of slot 266 below face 260 but less than the cross section area of limiting orifice 256. When diaphragm 268 engages the boss 262 on the face 260 it closes the top of slot 266 so that the slot becomes effective as a control orifice.

A chamber 276 is provided in cover 270 and defined by that cover and diaphragm 268. It preferably has the same diameter as does the upper chamber end 258. A recess 278 is provided in cover 270 and connects with chamber 276 and the passage 280. A plunger 282 is received in recess 278. This plunger has a head 284 larger in diameter than recess 278 and extending into chamber 276 and having a spherical or similar curved section surface 286 engaging diaphragm 268. A passage 288 extends through plunger 282 along the axis thereof and is in alignment with orifice 274 and recess 264 to provide a fluid flow passage from passage 280 to orifice 274. A plunger spring 290 is received about the plunger shank 292 within recess 278 and is seated at the bottom of the recess adjacent passage 280. It acts against the back side of plunger head 284 to keep the plunger surface 286 in engagement with diaphragm 268 around orifice 274. Fluid pressure from passage 280 can therefore pass through recess 278 and into orifice 274 directly to the chamber upper and 258 when the diaphragm is not in engagement with boss 262, or from orifice 274 through recess 264 and the effective orifice formed by slot 266 and diaphragm 268 when the diaphragm engages face 260 of boss 262. Diaphragm 268 is therefore subject to pressures in chamber end 258 and chamber 276 to move plunger 282 against the force of spring 290 and to adjust the diaphragm position in relation to boss 262. The slot orifice 266 is therefore the controlling orifice when diaphragm 268 engages boss 262. Orifice 274 is the controlling orifice when diaphragm 268 is spaced from boss 262 at about the full stroke limit of plunger 282. Diaphragm 268 has an intermediate series of positions wherein the effective controlling orifice is the varying orifice section area of slot 266 together with the space between face 260 of boss 262 and the adjacent surface of diaphragm 268. The details of operation of this portion of the system are disclosed and described in the copending application Serial No. 115,539, entitled, Speed Control System and filed June 7, 1961, now Patent No. 3,183,993. Reference is therefore made to that patent for details of operation and the disclosure of that patent is hereby incorporated as if fully reproduced herein.

In order to sense the vehicle speed the speedometer cable transmission drive gear 300 is connected to drive a fluid pressure pump 302 with the speedometer drive cable 304 continuing from the pump to the vehicle speedometer. Pump 302 is connected by an input conduit 306 to the fluid reservoir 308. A pump output conduit 310 is also provided. A pump bypass line 312 connects conduits 306 and 310 and may be built into the pump body. An adjustable bypass orifice restriction 314 is located in bypass 312 to establish a desired output pressure in relation to a given pump speed. In normal operation this restriction need not be further adjusted after having once been calibrated to the pump. Another bypass line 316 connects pump output line 310 with the reservoir 308 through an adjustable valve 318. This valve is normally adjustable by the vehicle operator to set the desired speed at which the system is to control the throttle valve. Pump output line 310 is connected to the Bourdon tube 320 at one tube end 322 which is secured to a mount 324 attached to the servo housing 38 adjacent control chamber 42. The other end 325 of tube 320 is closed. It is therefore obvious that the pump output pressure is imposed on the coiled tube 320 and that the degree of opening of valve 318 affects the pressure exerted on tube 320. A rotatable plate 326 is attached to tube end 325 and rotates about mount 324 under movement occasioned by the expansion and contraction of Bourdon tube 320 resulting in movement of tube end 322. The fluid circuit comprised of reservoir 308, conduit 306, pump 302, conduit 310 and tube 320, with line 316 and bypass 312, is a closed fluid flow and pressure circuit in which variable restriction means 314 and 318 are located. In some instances it may be desirable to only utilize one variable restriction means. Each of the variable restrictions 314 and 318 modify the fluid in the closed circuit in its flow and pressure characteristics. Since restriction 314 is usually adjusted only initially, it requires a predetermined minimum fluid flow at all times before the pump commences to generate pressure in the circuit. Since the valve 318 acts as a restriction to flow which is set in accordance with a desired set speed, it requires the pump to produce a predetermined minimum fluid flow in addition to that already required by restriction 314 before the pump commences to generate an effective pressure in the circuit, and particularly in conduit 310 and tube 320. If the valve 318 is closed completely, the minimum fluid flow required to overcome the bleeding action of restriction 314 will determine the minimum desired set speed. If the valve 318 is opened, creating a greater flow and pressure bleed condition, a greater desired speed setting is obtained. A flat valve 328, also preferably made of Mylar, is attached to rotating plate 326 and is in sliding engagement with a flat portion of housing 38 so that it will cover and uncover in varying degrees the orifice 330 connecting chamber 42 to the atmosphere. The operation of valve 328 is also illustrated in FIGURE 1a.

The Bourdon tube 320 is so designed that it will begin the move valve 328 to close orifice 330 at a predetermined pressure. This pressure is obtained in relation to the set speed by adjustment of valve 318 after calibrating restriction 314. The movement of valve 328 to start closing orifice 330 preferably occurs when the vehicle reaches a speed approximately five miles below the set speed. The closing of orifice 330 restricts admission of atmospheric air into chamber 42. Chamber 42 is connected to the intake manifold 12, which is a source of air under reduced pressure, and therefore is also subjected to a reduced pressure depending upon the amount of closure of orifice 330 as well as the operation of the negative feedback valve assembly 66. Diaphragm 40 will move to the left as seen in the drawing under influence of the reduced pressure in chamber 42 and atmospheric pressure in chamber 44. This causes throttle valve 16 to be opened further since the force of diaphragm 40 is transmitted through arm 34, rod 28 and link 26. This causes a further increase in vehicle speed so that Bourdon tube 320 is further expanded, causing valve 328 to entirely close orifice 330 and move to the other side of the orifice, where it begins to open the orifice. The valve 328 is, therefore, continuously movable in one direction as the fluid pressure in the tube 320 acting on the tube changes in one direction, so that, upon sufficient change in the fluid pressure, the valve sequentially closes and opens the orifice 330. The closing and opening of the orifice is variable, so that a modulating effect is obtained, with the effective orifice area being sequentially decreased to zero and then increased. Thus the valve 328 and orifice 330 constitute valve means and a fluid passage connecting atmospheric pressure to the chamber 42 of the fluid pressure differential responsive force producing means or power servo 36, modulates atmospheric air pressure, and is actuated by the fluid pressure differential responsive force producing means 320 to control the admission of atmospheric air pressure into the chamber 42 in accordance with the modified fluid pressure generated in conduit 310 and tube 320.

As further movement of valve 328 opens orifice 330 to a greater extent the absolute pressure in chamber 42 increases due to the modulating effect of valve 328 on orifice 330 by atmospheric air modification. This increase in absolute pressure allows movement of diaphragm 40 to the right under influence of spring 30, letting the throttle valve 16 close slightly and holding the diaphragm 40 in a position so that the vehicle is maintained at the set speed. Should the actual vehicle speed increase slightly valve 328 will move to further open orifice 330, thereby increasing further the absolute pressure in chamber 42 and permitting further closure of the throttle valve 16 under the force of throttle return spring 30.

If the vehicle speed decreases slightly from the set speed, valve 328 will move to close orifice 330 to some extent, thereby decreasing the absolute pressure in servo chamber 42 and causing diaphragm 40 to move throttle valve 16 in the throttle opening direction to increase the vehicle road speed until the same control speed is again attained. As orifice 330 is closed to some extent in this manner, the absolute pressure in chamber 248 and its upper end 258 decreases, acting on diaphragm 268 to move the diaphragm toward the face of boss 262 so that the smaller orifice 266 becomes the controlling orifice which admits raw vacuum into chamber end 258, instead of orifice 274. The clearance between the lower surface of diaphragm 268 and face 260 of boss 262 decreases as this action occurs and a range of operation is attained wherein the net affect is the provision of a variable controlling orifice intermediate the sizes of orifices 266 and 274. Therefore, the action of orifices 266 and 274, diaphragm 278 and the pressures in chamber end 258 and chamber 276 provide a degenerative or negative feedback system which eliminates system hunting. Orifice 256, being larger than either of the orifices 266 and 274, has no effect on the pressure signal in various portions of the chamber 248 unless inlet diaphragm 268 is ruptured so as to accidentally provide an orifice having greater area than orifice 256. Orifice 256 would then become a controlling orifice which would permit operation of the system without any feedback characteristics and would slightly lower the control speed below the set speed.

The speed control mode of operation of the system may be temporarily interrupted at any time by the operation of the vehicle brake pedal. When the spoiler valve assembly 96 is actuated to introduce atmospheric pressure into chamber 42 of servo 36, throttle return spring 30 immediately returns the servo and the throttle valve 16 toward the zero throttle position. Orifice 112 and control pressure line 60 are sufficiently large to transmit the atmospheric pressure to chamber 42 even through raw intake manifold vacuum is present in conduit 92 up to the controlling orifice of the negative feedback valve assembly 66. If the spoiler valve 108 is held open until the vehicle speed decreases below the range of control sensitivity as determined by valve 328 when it first begins to close orifice 330 as above described, the valve 328 will not be able to control orifice 330 and the throttle will not resume its automatic operation until the vehicle operator has again brought the vehicle speed into the range of control sensitivity. If, however, the brake pedal 98 is released so that valve 108 is closed while the vehicle speed is still in the range of control sensitivity, the system will return the vehicle to the set speed. The operator can eliminate automatic operation of the system by opening valve 318 fully so that the pressure output of pump 302 is returned directly to the reservoir 308 without affecting Bourdon tube 320 sufficiently to move valve 328. In effect this sets the range of control sensitivity out of the vehicle speed range. Atmospheric pressure is therefore admitted to the servo chamber 42 through orifice 330 and is sufficiently unrestricted so as to prevent the servo from being actuated.

By referring to the above description of operation it can be seen that structure producing fluid pressure variations throughout a predetermined pressure range of a fluid pressure has been disclosed. The pump 302 generates a fluid pressure and the engine 10 generates another fluid pressure in the intake manifold. As the pressure from pump 302 increases and acts on Bourdon tube 320, valve 328 is moved to close orifice 330 in accordance with the pressure sensed by the Bourdon tube. This more restrictively vents the servo chamber 42, resulting in an increase in the amount of vacuum in that chamber, or a reduction in the absolute pressure in that chamber. As pressure in Bourdon tube 320 increases to a greater extent, valve 328 closes then begins to open orifice 330. Since this is providing a greater venting action to chamber 42, the vacuum in that chamber decreases, or the absolute pressure increases. The pressure in chamber 42 therefore varies throughout a first range of pressure sensed by tube 320 to increase and throughout a continuing second range of increase in pressure sensed by tube 320 to decrease.

What is claimed is:

1. In combination in a vehicle road speed control system for controlling a vehicle engine throttle to maintain a constant vehicle speed; a fluid servo connectible to move the engine throttle toward the open position under fluid pressure applied thereto; a source of variable fluid pressure; a degenerative feedback control responsive to fluid pressure of said source for said servo; conduit means connecting said fluid pressure source to said degenerative feedback control and connecting said degenerative feedback control to said servo; and means for controllably venting said servo in accordance with vehicle speed to maintain a constant vehicle speed and including an orifice connecting with said servo and another source of differential fluid pressure, a valve for infinitely varying the effective orifice area of said orifice between the fully closed and open orifice conditions, fluid pressure responsive means for moving said valve in accordance with a generated fluid pressure reflective of vehicle speed error from a desired vehicle speed, vehicle speed responsive pressure generating means for generating a vehicle speed reflective fluid pressure, and means for modifying said vehicle speed reflective fluid pressure in accordance with the desired vehicle speed to produce the generated fluid pressure reflective of vehicle speed error for controlling said valve.

2. The combination of claim 1, said pressure responsive means being a Bourdon tube having one fixed end and a movable end movable in accordance with fluid pressure changes therein and having said valve operatively secured thereto for movement therewith.

3. The combination of claim 1, said vehicle speed responsive pressure generating means comprising a hydraulic fluid pump driven in accordance with vehicle speed and producing said vehicle speed reflective fluid pressure, said modifying means comprising an infinitely adjustable bypass valve connected to the pump output for by-passing hydraulic fluid in accordance with a desired vehicle speed whereby the fluid pressure delivered to said pressure responsive means reflects vehicle speed error.

4. In a fluid pressure system for association with first and second and third sources of fluid at different pressures, the combination of a first fluid flow and pressure circuit having the first source of fluid pressure therein and variable restriction means modifying the fluid from the first source to require a predetermined minimum fluid flow in the circuit generated by the pressure source before generation of pressure in said circuit commences and first fluid pressure responsive force-producing means connected to form a closed fluid circuit, a second fluid flow and pressure circuit having said second and third sources of fluid pressures providing fluid flow and pressure inputs thereto and a second fluid pressure differential responsive force-producing means having a first chamber receiving fluid pressure from said second source of fluid pressure and a power wall forming one wall of a second chamber and also forming one wall of a third chamber receiving fluid pressure from said third source of fluid pressure, and means connecting the third source of fluid pressure to said second chamber, said last named means including a fluid passage and valve means modulating fluid pressure from the third fluid pressure source into said second chamber and actuated by said first fluid pressure responsive force-producing means to control the admission of pressure into the second chamber from the third fluid pressure source in accordance with the modified fluid pressure generated in said first circuit.

5. The combination of claim 4, said valve means reducing the admission of pressure from the third fluid pressure source into the second chamber as the fluid pressure acting on said first fluid pressure responsive force-producing means changes in one direction in a first range of pressure change and increasing the admission of pressure from said third fluid pressure source to the second chamber as the fluid pressure acting on said first fluid pressure responsive force-producing means changes further in the same one direction in a second range of pressure change.

6. The combination of claim 4, said valve means having a continuous movement in one direction as the fluid pressure in said first circuit acting on said first fluid pressure responsive force-producing means changes in one direction and sequentially closing and opening said fluid passage during the continuous movement of the valve means in the one direction.

7. In a vehicle control mechanism controlling the vehicle engine in accordance with a reference vehicle speed, means generating a fluid dynamic signal reflecting vehicle speed, means modifying said fluid dynamic signal in accordance with a reference vehicle speed to produce a first fluid pressure reflecting vehicle speed error, fluid pressure responsive force-producing means receiving said first fluid pressure, a source of second fluid pressure and a source of third fluid pressure different from each other and from said first fluid pressure, a servomotor having a housing and a power wall movable therein dividing said housing into a first chamber and a second chamber and having a vehicle engine controlling member secured to said power wall and movable therewith in response to pressure differentials acting on said power wall, means connecting said second fluid pressure source to said first chamber, means connecting said third fluid pressure source to said second chamber, and means including a variable effective area orifice connecting said third fluid pressure to said first chamber and having an orifice control valve movable by said fluid pressure responsive force-producing means and varying the effective area of said orifice to produce a variable pressure in said first chamber in accordance with said first fluid pressure.

8. In the mechanism of claim 7, said orifice control valve being movable in one direction by said fluid pressure responsive force-producing means as fluid pressure acting thereon changes in one direction to sequentially decrease the effective orifice area to zero and then increase the effective orifice area.

References Cited by the Examiner
UNITED STATES PATENTS

| | | |
|---|---|---|
| 2,116,992 | 5/38 | Weaver. |
| 2,367,606 | 1/45 | Olson. |
| 3,062,310 | 11/62 | McCatheron et al. _____ 180—82.1 |
| 3,068,849 | 12/62 | Thorner _____ 180—82.1 X |
| 3,099,329 | 7/63 | Von Berg et al. _____ 180—82.1 |
| 3,133,610 | 5/64 | Sheppard _____ 180—82.1 |

BENJAMIN HERSH, *Primary Examiner.*

A. HARRY LEVY, *Examiner.*